United States Patent [19]

Dawson, Jr.

[11] Patent Number: 4,478,028

[45] Date of Patent: Oct. 23, 1984

[54] DEMOUNTABLE LAWN EDGER/MOWER COMBINATION

[76] Inventor: Gerthen L. Dawson, Jr., 3984 Callahan Dr., Memphis, Tenn. 38127

[21] Appl. No.: 576,367

[22] Filed: Feb. 2, 1984

[51] Int. Cl.³ .............................................. A01G 3/06
[52] U.S. Cl. .................................... 56/16.9; 56/256
[58] Field of Search ...................... 56/16.9, 13.7, 13.6, 56/13.8, 15.2, 256, 11.3

[56] References Cited

U.S. PATENT DOCUMENTS

| | | | |
|---|---|---|---|
| 2,771,730 | 11/1956 | True | 56/13.7 |
| 3,782,085 | 1/1974 | Parker | 56/16.9 |
| 3,969,877 | 7/1976 | Moss et al. | 56/256 |

Primary Examiner—Jay N. Eskovitz
Attorney, Agent, or Firm—Walker & McKenzie

[57] ABSTRACT

An apparatus for edging and mowing lawns. A rotary lawn edger is demountably attached to a rotary lawn mower for being driven by the motor of the mower through a power take-off, a positive first speed increaser drive and a slippable second speed increaser drive.

14 Claims, 11 Drawing Figures

DEMOUNTABLE LAWN EDGER/MOWER COMBINATION

BACKGROUND OF THE INVENTION

1. Field of the Invention

The present invention relates, in general, to lawn mowers for mowing lawns and to lawn edgers for edging lawns around curbs, sidewalks, and the like.

2. Description of the Prior Art

Two common powered tools for lawn care are the motorized vertical shaft rotary blade lawnmower and the motorized horizontal shaft rotary blade edger. Sequential use of each of these tools is normally necessary to maintain a lawn in a neat appearance. The homeowner uses such equipment a limited number of times during each growing season. The motor or engine powering these devices is often their most expensive component. Cost of lawn maintenance can be substantially reduced by providing means of using one basic unit to provide motive power to both the lawn mower and the edger. Combination devices or attachments have been suggested and disclosed in the following patents: True, U.S. Pat. No. 2,739,437; Carlton, U.S. Pat. No. 3,057,411; Pratt, U.S. Pat. No. 3,183,652; Bergeson, U.S. Pat. No. 3,192,693; Rhodes, U.S. Pat. No. 3,421,300; Borunda, U.S. Pat. No. 3,604,208; Patterson, U.S. Pat. No. 3,690,384; Lowery, U.S. Pat. No. 3,693,334; Keesee, U.S. Pat. No. 3,698,165; and Chaney, U.S. Pat. No. 3,803,818. None of the above patents disclose or suggest the present invention.

SUMMARY OF THE INVENTION

The present invention combines mower and edger designs with features which minimize or eliminate the disadvantages of the component not in active use when operating either the mower or the edger functionally.

The demountable lawn edger/mower combination of the present invention includes, in general, a rotary lawn mower including a housing having a generally horizontal platform member, a motor mounted on the platform member, the motor having a generally vertical first drive shaft extending beneath the platform member and having a generally horizontal second drive shaft positioned above the platform member, and a generally horizontal mower blade member attached to the first drive shaft beneath the platform member; a rotary lawn edger including an elongated body member having first and second ends, a generally horizontal edger drive shaft member rotatably mounted to the first end of the body member, and a generally vertical edger blade member attached to the edger drive shaft member; an attachment means for demountably attaching the second end of the body member of the edger to the housing of the mower; a generally horizontal intermediate shaft member rotatably supported above the platform member of the housing of the mower; a first speed increaser drive means for causing the intermediate shaft member to rotate at a speed faster than the second drive shaft of the motor of the mower, the first speed increaser drive means including positive drive means for positively coupling the intermediate shaft member and the second drive shaft of the motor of the mower; and a second speed increaser means for causing the edger drive shaft member to rotate at a speed faster than the intermediate shaft member, the second speed increaser means including drive means coupling the edger shaft member and the intermediate shaft member.

One object of the present invention is to combine a horizontal blade rotary powered lawn mower with a simply and conveniently mounted and demountable edger attachment to be powered from the same motive device.

Another object of the present invention is to provide means for conveniently and quickly mounting and demounting an edger attachment on a lawn mower and to provide means for engaging or disengaging power from the lawn mower to the cutting head of the edger.

Another object of the present invention is to provide a lawn mower, demountable edger combination without encumbrance of the lawn mowing function.

Another object of the present invention is to provide a lawn mower/demountable edger combination while maintaining the safety features, convenience, utility and operability of the usual dependent components.

Another object of the present invention is to provide a lawn mower/edger combination using standard components and sub-assemblies so as to minimize cost of manufacture, sale and maintenance.

DESCRIPTION OF THE PREFERRED EMBODIMENT

Figure 1:
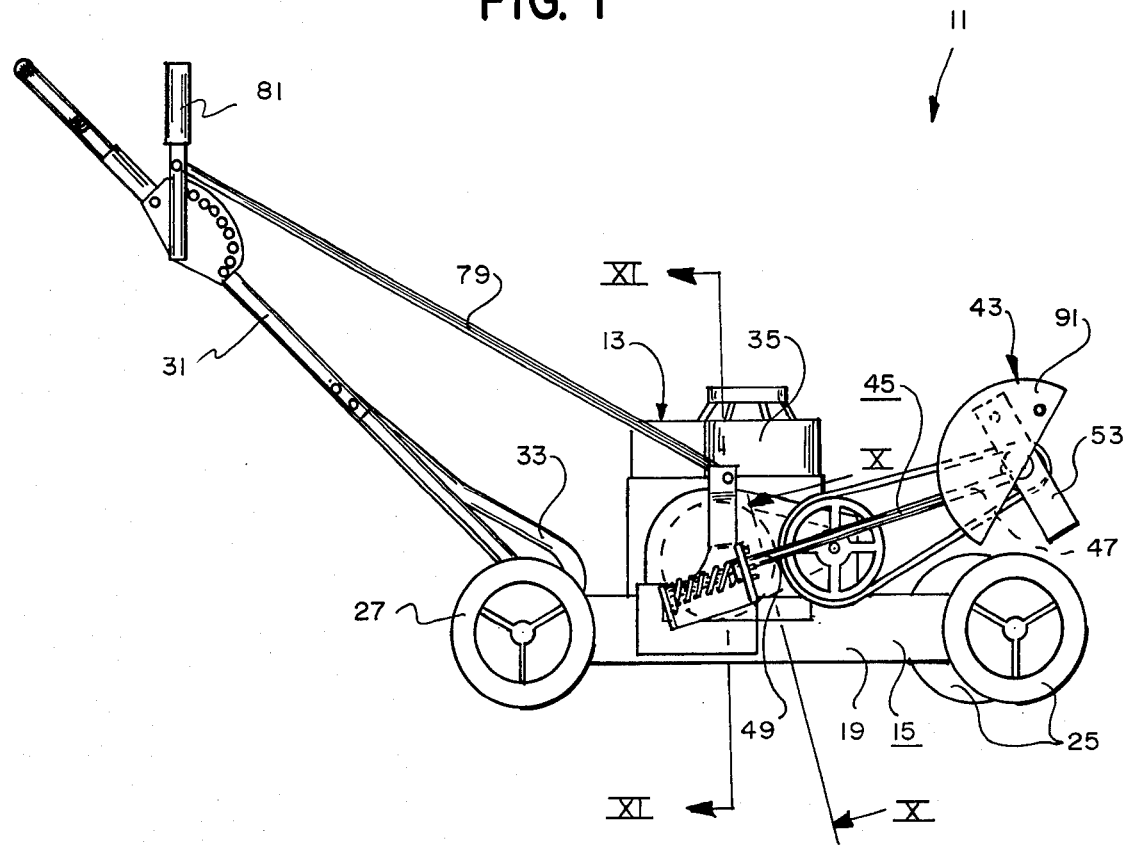
FIG. 1 is a side elevational view of the apparatus of the present invention.

The apparatus 11 of the present invention is for edging and mowing lawns and consists essentially of a demountable lawn edger/mower combination.

The apparatus 11 includes a rotary lawn mower 13 (see, in general, FIGS. 1-3) for use in mowing the lawn in a substantially typical manner. The mower 13 includes a housing 15 having a generally horizontal platform member 17. The housing 15 preferably includes a downwardly directed skirt 19 extending around the periphery of the platform member 17. The platform member 17 may be substantially rectangular in shape and defines, in general, a front end 21 and a rear end 23 (see FIG. 3). A pair of front wheel members 25 are preferably rotatably mounted on the skirt 19, one on either side of the front end 21. Likewise, a pair of rear wheel members 27 are preferably rotatably mounted on the skirt 19, one on either side of the rear end 23. Typical adjustment means 29 may be provided to mount each wheel member 25, 27 to the skirt 19 in a manner which allows the effective height of the platform member 17 above the lawn to be varied. The construction of the adjustment means 29 may be varied as will be apparent to those skilled in the art. A rearwardly extending handle member 31 is preferably mounted at a fixed angle to the rear end 23 of the platform member 17 to allow the mower 13 to be easily pushed over the lawn. A brace 33 may extend from the handle member 31 to the platform member 17 to maintain the handle member 31 at the fixed angle relative to the platform member 17.

The mower 13 includes a motor 35. The motor 35 may be of any substantially typical gas or electric motor commonly used for lawn mowing equipment and the like and is preferably fixedly attached to the platform member 17. The motor 35 has a generally vertical first drive shaft 37 extending beneath the platform member 17 and has a generally horizontal second drive shaft 39 positioned above the platform member 17 (see, in general, FIGS. 3 and 4). The second drive shaft 39 is commonly referred to as a power take-off (PTO).

Figure 4:
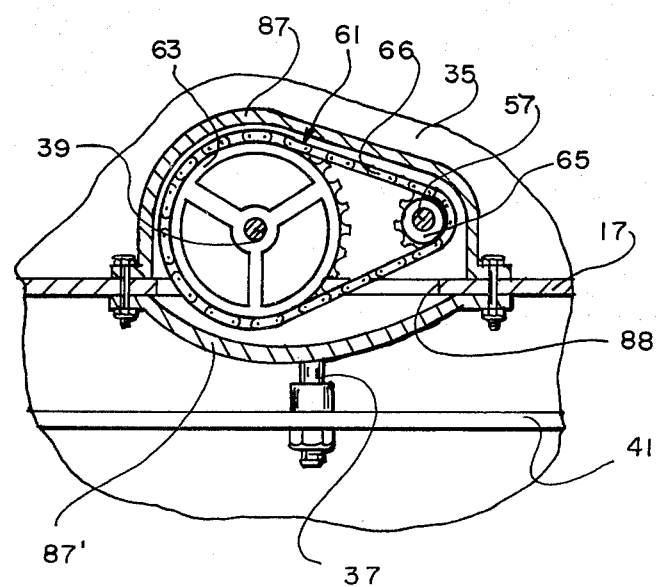
FIG. 4 is an enlarged sectional view of a portion thereof substantially as taken on line IV—IV of FIG. 3.

The mower 13 includes a generally horizontal mower blade member 41 for being attached to the first drive shaft 37 beneath the platform member 17 (see FIG. 4). The blade member 41 cuts or mows the lawn as the mower 13 is moved thereover in the typical manner.

The apparatus 11 includes a rotary lawn edger 43 for use in edging the lawn around sidewalks, curbs, and the like in a substantially typical manner. The edger 43 includes an elongated body member 45 having a first end 47 and a second end 49. The edger 43 includes a generally horizontal edger drive shaft 51 rotatably mounted to the first end 47 of the body member 45 and includes a generally vertical edger blade member 53 attached to the edger drive shaft member 51.

The apparatus 11 includes an attachment means 55 for demountably attaching the second end 49 of the body member 45 of the edger 43 to the housing 15 of the mower 13 as will be hereinafter described in detail.

The apparatus 11 includes a generally horizontal intermediate shaft 57 rotatably supported above the platform member 17. Thus, for example, one or more typical bearing assemblies 59 may be fixedly mounted on the platform member 17 for rotatably supporting the shaft member 57.

The apparatus 11 includes a first speed increaser drive means 61 for causing the intermediate shaft member 57 to rotate at a speed faster than the second drive shaft 39. The first speed increaser drive means 61 includes a positive drive means for positively coupling the intermediate shaft member 57 and the second drive shaft 39. The first speed increaser drive means 61 may include a relatively large sprocket member 63 fixedly attached to the second drive shaft 39 for being rotated thereby and a relatively small sprocket member 65 fixedly attached to the intermediate shaft member 57. The positive drive means of the first speed increaser drive means 61 may then be defined by an endless chain member 66 coupling the sprocket members 63, 65.

The apparatus 11 includes a second speed increaser means 67 for causing the edger drive shaft member 51 to rotate at a speed faster than the intermediate shaft member 57. The second speed increaser means 67 includes a drive means for coupling the edger drive shaft member 51 and the intermediate shaft member 57. The second speed increaser means 67 may include a relatively large pulley member 69 fixedly attached to the intermediate shaft member 57 for rotation therewith and may include a relatively small pulley member 71 fixedly attached to the edger drive shaft member 51. The drive means of the second speed increaser means 67 may be defined by an endless belt member 73 for joining the pulley members 69, 71.

Figure 2:
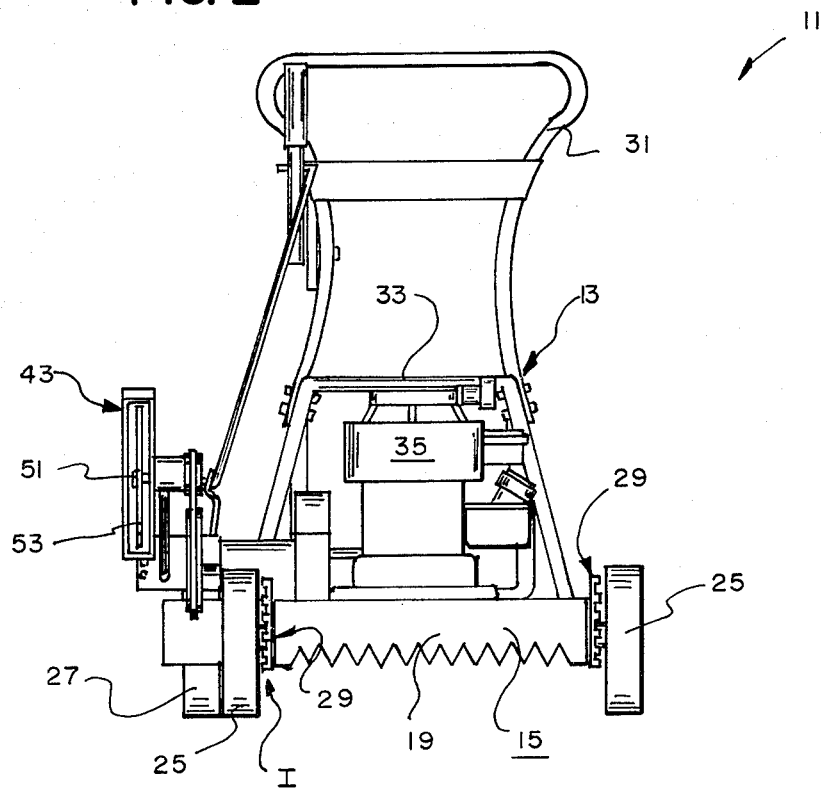
FIG. 2 is a front elevational view thereof.
Figure 3:
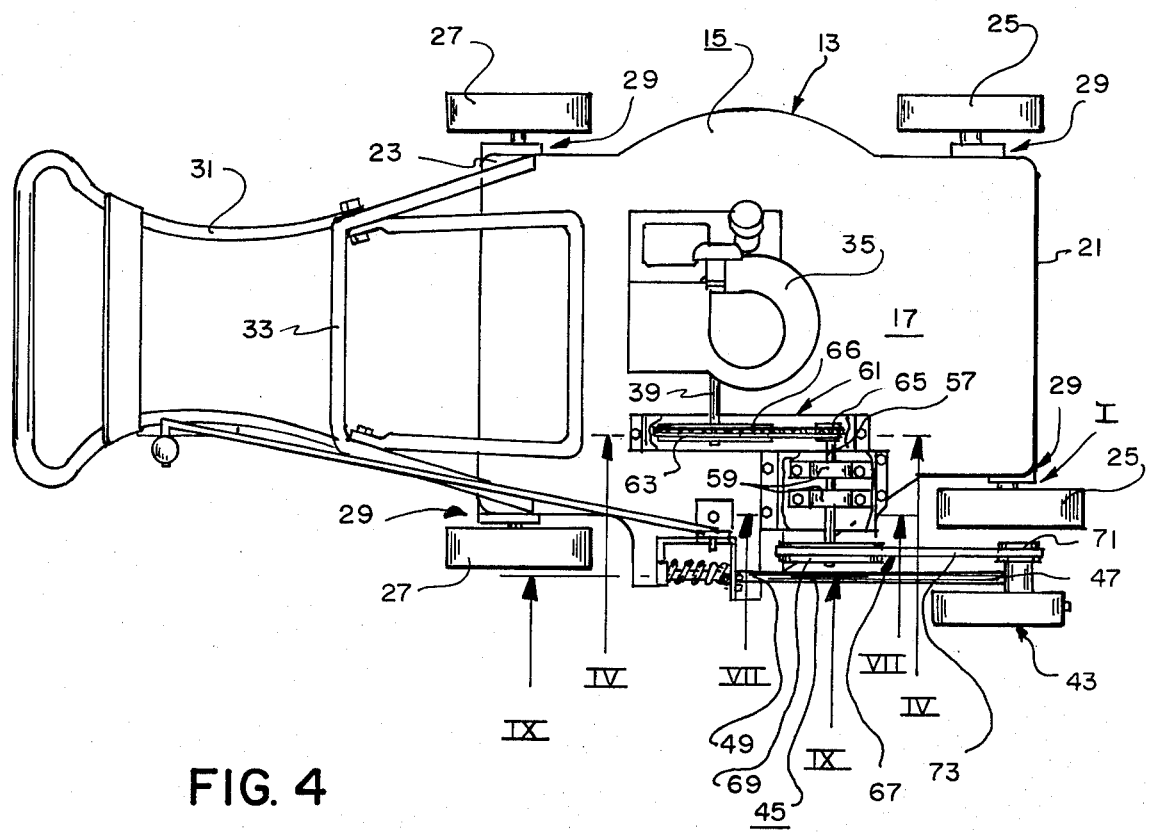
FIG. 3 is a top plan view thereof.
Figure 8:
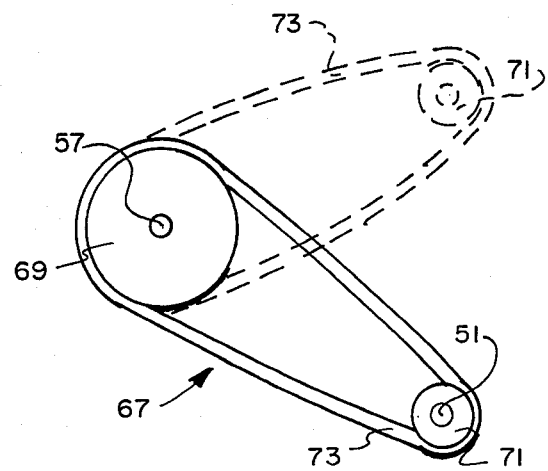
FIG. 8 is a substantially diagrammatic view of a second speed increaser means of the apparatus of the present invention, showing a raised position in broken lines.

The attachment means 55 preferably allows the edger blade member 53 to be moved between a raised, nonoperating position as shown in FIGS. 1 and 2 and as indicated by broken lines in FIG. 8, and one or more lowered operating positions as indicated by solid lines in FIG. 8. More specifically, the attachment means 55 may include a bolt means 74 for pivotally attaching the second end 49 of the body member 45 to the housing 15. That is, the bolt means 74 may pivotally attach a connector member 75 to a mount 76 or the like which is fixedly attached to the platform member 17 by way of bolts 76' or the like (see, in general, FIG. 11). The connector member 75 preferably includes an outwardly extending arm member 77' for receiving the second end 49 of the body member 45, and an upwardly extending arm member 77". A control rod 79 preferably extends from the upper end of the arm member 77" to the handle member 31 where it is connected to a lever 81 mounted on the handle member 31 to allow the arm member 77" and, therefore, connector member 75 and the second end 49 of the body member 45 to pivot about the bolt means 74 thereby moving the first end 47 of the body member 45 and the edger blade member 53 between the raised and lowered positions. The relative positions of the pulley members 69, 71 and belt means 75 are such that the belt member 73 defines a clutch means so that when the edger blade member 53 is raised, the distance between the pulley members 69, 71 is decreased and the belt member 73 is slackened or loosened with respect to the pulley members 69, 71 (see the broken line shown in FIG. 8) and the edger drive shaft member 51 is not powered. When the edger blade member 53 is pivoted downward, the belt member 73 is tightened with respect to the pulley members 69, 71 and the edger drive shaft member 51 is driven. Thus, the pulley members 69, 71 and belt member 73 coact with the attachment means 55 to act as an automatic clutch.

Figure 11:
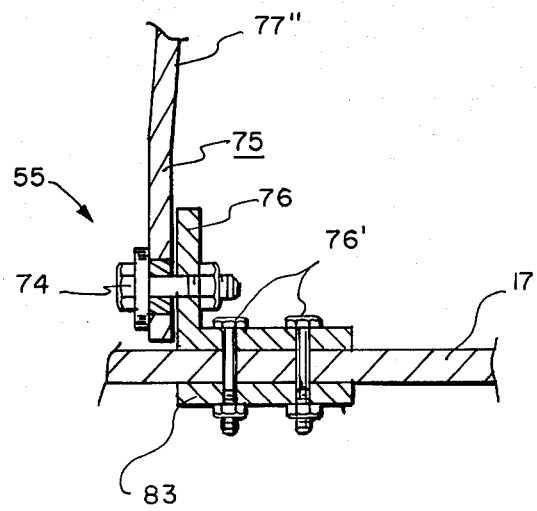
FIG. 11 is an enlarged sectional view substantially as taken on line XI—XI of FIG. 1.

A reinforced mounting pad 83 is preferably provided beneath the platform member 17 for coacting with the mount 76 and bolts 76' in rigidly securing the body member 45 to the housing 15 as clearly shown in FIG. 11.

The front end 21 of the platform member 17 and the body member 45 are preferably extended to give the apparatus better balance. One of the front wheel members 25 is preferably inset as at I (see FIGS. 2 and 3) with respect to the rear wheel members 27 to provide additional clearance for the edger blade member 53. The front end of the skirt 19 preferably has a plurality of tooth-like cutouts 85 for allowing easy entry of grass.

Figure 7:
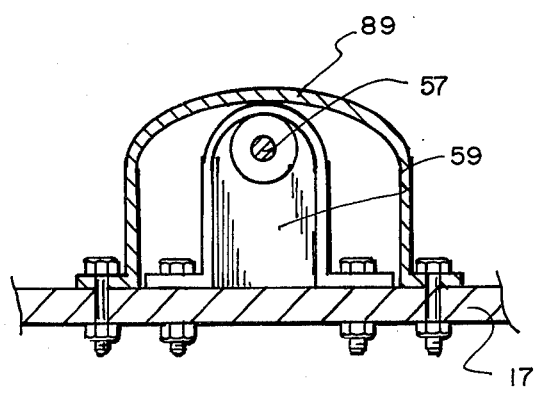
FIG. 7 is a sectional view substantially as taken on line VII—VII of FIG. 3.

A housing 87 is preferably positioned over the sprocket members 63, 65 and the chain member 66 (see, in general, FIG. 7) for protection of the first speed increaser means 61 and for safety. The size of the sprocket member 63 may be such that an aperture 88 may have to be provided in the platform member 17 (see FIG. 4) to accommodate the sprocket member 63 and chain member 66. In such a case, a lower housing 87' may be positioned beneath the sprocket members 63, 65 and the chain member 66 (see FIG. 4) for protection thereof. Likewise, a housing 89 may be attached to the platform member 17 and cover the bearing assemblies 59 (see, in general, FIG. 7) for protecting the bearing assemblies 59 and for safety.

Figure 5:
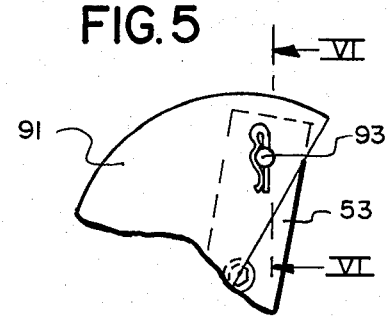
FIG. 5 is a side elevational view of a portion thereof showing a stop means thereof.
Figure 6:
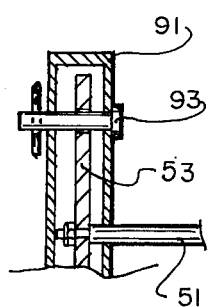
FIG. 6 is a sectional view substantially as taken on line VI—VI of FIG. 5.

A housing member 91 may be attached to the first end 47 of the body member 45 (see, in general, FIG. 1) for covering a portion of the edger blade member 53 for safety reasons. A brake or stop means may be provided to positively ensure that the edger blade member 53 does not rotate when in a raised position. The brake or stop means may consist simply of a pin 93 extending through the housing member 91 in a position so as to contact and prevent rotation of the edger blade member 53 (see, in general, FIGS. 5 and 6).

Figure 9:
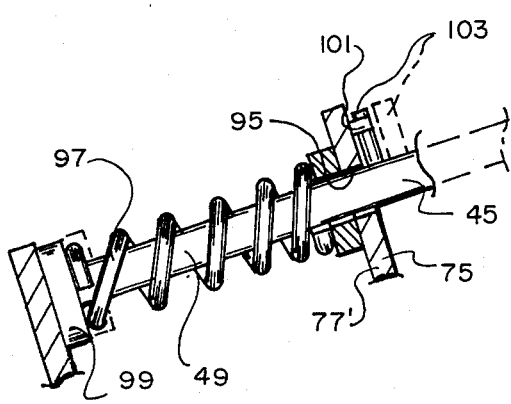
FIG. 9 is an enlarged sectional view substantially as taken on line IX—IX of FIG. 3.
Figure 10:
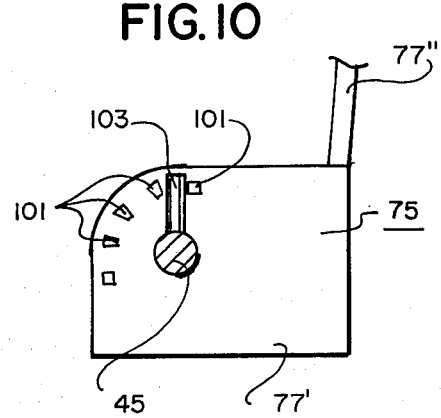
FIG. 10 is an enlarged sectional view substantially as taken on line X—X of FIG. 1.

The attachment means 55 may be constructed so as to allow the body member 45 to pivot somewhat about its longitudinal axis so as to allow the edger blade member 53 to be pivoted somewhat out of its normal vertical position to allow edging operations at an angle relative to the vertical for reasons as will now be apparent to those skilled in the art. Thus, the second end 49 of the body member 45 may merely extend through an aperture 95 in the outwardly extending arm 77' of the connector member 75 and be coupled thereto by a spring 97 and an enlargement 99 on the very end of the arm 77' (see, in general, FIG. 9). A plurality of radially spaced lugs 101 may then be provided on the face of the arm 77' and a coacting finger 103 provided on the body member 45 (see, in general, FIG. 10) to allow the body member 45 to be rotated between fixed positions about its longitudinal axis as will now be apparent to those skilled in the art.

As thus constructed and used, the present invention provides a combination lawn edger/mower which allows both components to be simply and conveniently driven by the same motor. Additionally, simple removal of the single bolt means 74 allows the edger 43 to be easily removed from the apparatus 11 in a manner as will now be apparent to those skilled in the art.

Although the invention has been described and illustrated with respect to a preferred embodiment thereof and a preferred use therefore, it is not to be so limited since changes and modifications can be made therein which are within the full intended scope of the invention.

I claim:

1. Apparatus for edging and mowing lawns, said apparatus comprising:
   (a) a rotary lawn mower including a housing having a generally horizontal platform member, a motor mounted on said platform member and having a first drive shaft and a second drive shaft, and a generally horizontal mower blade rotatably coupled to said first drive shaft and located beneath said platform member;
   (b) a rotary lawn edger including an elongated body member having first and second ends, an edger shaft member rotatably attached to said first end of said body member of said edger, and a generally vertical edger blade member rotatably coupled to said edger shaft and located beside said housing of said mower;
   (c) attachment means for demountably attaching said second end of said body member of said edger to said housing of said mower;
   (d) an intermediate shaft rotatably supported on said housing of said mower;
   (e) a first speed increaser drive means for causing said intermediate shaft to rotate at a speed faster than said second drive shaft of said motor of said mower, said first speed increases drive means including positive drive means for positively coupling said intermediate shaft and said second drive shaft of said motor of said mower; and
   (f) a second speed increaser drive means for causing said edger shaft to rotate at a speed faster than said intermediate shaft, said second speed increaser drive means including slippable drive means for slippingly coupling said edger shaft and said intermediate shaft.

2. The apparatus of claim 1 in which said housing of said mower has an extended front end located forward of said mower blade.

3. The apparatus of claim 2 in which said body member of said edger is extended to position said first end thereof adjacent said extended front end of said housing of said mower.

4. The apparatus of claim 3 in which said mower includes a pair of rear wheel members and a pair of front wheel members mounted to said housing for rollably supporting said housing; in which one of said front wheel members is inset with respect to said rear wheel members; and in which said first end of said body member of said edger is positional substantially adjacent said inset front wheel member.

5. The apparatus of claim 4 in which said housing of said mower includes a skirt attached to and extending downwardly from said platform member thereof; and in which said skirt has a plurality of front cut-out portions for allowing said mower to easily roll over the lawn.

6. The apparatus of claim 5 which said mower includes an elongated, rearwardly extending handle member attached to said housing thereof, said handle member being lockable in a fixed position while said edger is being used.

7. The apparatus of claim 1 in which said attachment means includes a pivot rod for extending through said second end of said body member of said edger and a portion of housing of said mower to pivotally attach said body member of said edger to said housing of said mower and for allowing said first end of said body member of said edger to be moved between a raised, out-of-use position and a lowered, in-use position.

8. The apparatus of claim 7 in which is included means for moving said first end of said body member of said edger between said raised and lowered positions.

9. The apparatus of claim 8 in which said slippable drive means of said second speed increaser means is automatically disengaged when said first end of said body member of said edger is moved to said raised position.

10. The apparatus of claim 9 in which is included lock means for locking said first end of said body member of said edger in any of said positions.

11. The apparatus of claim 7 in which said housing includes a reinforced mounting pad for receiving said pivot rod.

12. The apparatus of claim 1 in which said first speed increaser drive means includes a relatively large sprocket member attached to said second drive shaft of said motor of said mower, a relatively small sprocket member attached to said intermediate shaft, and an endless chain member drivably joining said sprocket members.

13. The apparatus of claim 1 in which said second speed increaser drive means includes a relatively large pulley member attached to said intermediate shaft, a relatively small pulley member attached to said edger shaft, and an endless belt member drivably joining said pulley members.

14. The apparatus of claim 1 in which is included a first guard means for covering said first speed increaser drive means, a second guard means for covering a portion of said second speed increaser drive means, and a third guard means for covering a portion of said edger blade member of said edger.

* * * * *